United States Patent
Pandian et al.

(10) Patent No.: US 9,600,487 B1
(45) Date of Patent: Mar. 21, 2017

(54) SELF HEALING AND RESTARTABLE MULTI-STEAM DATA BACKUP

(71) Applicant: EMC Corporation, Hopkinton, MA (US)

(72) Inventors: Ilavarasu Pandian, Sunnyvale, CA (US); Hsing B. Yuan, Palo Alto, CA (US); Moiz Haidry, Campbell, CA (US); Hymanand Nellore, Cupertino, CA (US); Ramya Mudduluri, Sunnyvale, CA (US); Abhijeet Kodgire, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 313 days.

(21) Appl. No.: 14/320,265

(22) Filed: Jun. 30, 2014

(51) Int. Cl.
*G06F 17/30* (2006.01)

(52) U.S. Cl.
CPC ...... *G06F 17/30088* (2013.01); *G06F 17/302* (2013.01); *G06F 17/30097* (2013.01)

(58) Field of Classification Search
CPC ........... G06F 17/3007; G06F 17/30156; G06F 17/30961; G06F 17/30339; G06F 17/30442; G06F 17/30306; G06F 17/30289; G06F 17/30498; G06F 17/30389; G06F 17/30598; G06F 12/06; G06F 2212/1041; G06F 2212/202; G06F 2212/254; G06F 2212/251; G06F 17/30088; G06F 17/30097; G06F 17/302
See application file for complete search history.

(56) References Cited

U.S. PATENT DOCUMENTS

| | | | | |
|---|---|---|---|---|
| 6,549,992 | B1 * | 4/2003 | Armangau | G06F 11/1456 707/999.202 |
| 7,890,794 | B1 * | 2/2011 | Gasser | G06F 11/0727 711/159 |
| 2010/0077160 | A1 * | 3/2010 | Liu | G06F 3/0482 711/162 |

(Continued)

OTHER PUBLICATIONS

Danny Harnik—"Side Channels in Cloud Services: Deduplication in Cloud Storage"—Year: 2010, vol. 8, Issue: 6—Browse Journals & Magazines—IEEE Security & Privacy—vol. 8 Issue: 6—pp. 40-47.*

(Continued)

*Primary Examiner* — Anh Ly
(74) *Attorney, Agent, or Firm* — Krishnendu Gupta; Sean M. Evans (57) ABSTRACT

Implementations are provided herein for a self-healing scalable ring communication topology that enables a multi-stream restartable backup. A standard network management protocol tree-walk process can be altered to support parallel tree-walk. Parallel tree-walk provides for splitting a backup directory among multiple sessions, where each session, in parallel, can walk the tree of portions of a backup directory and stream the results to separate backup storage devices. By allowing multiple backup sessions to work together to back up a single root directory, the backup process becomes more scalable to very large scale data storage systems. In addition, if a single stream of a multi-stream backup experiences a failure, only that stream need be restarted and other streams of the backup can continue without or with very little interruption.

20 Claims, 7 Drawing Sheets

(56) References Cited

U.S. PATENT DOCUMENTS

| | | | | |
|---|---|---|---|---|
| 2011/0110646 A1* | 5/2011 | Smith | .................... | H04H 20/31 |
| | | | | 386/241 |
| 2011/0185288 A1* | 7/2011 | Gupta | .................... | G06Q 10/10 |
| | | | | 714/E11.023 |
| 2012/0084523 A1* | 4/2012 | Littlefield | ........... | G06F 11/1469 |
| | | | | 711/162 |
| 2012/0259815 A1* | 10/2012 | Olson | ................. | G06F 11/1458 |
| | | | | 707/649 |
| 2012/0259897 A1* | 10/2012 | Manasse | ................ | G06F 21/10 |
| | | | | 707/803 |

OTHER PUBLICATIONS

Michael Vrable, Stefan Savage, and Geoffrey M. Voelker—"Cumulus: Filesystem Backup to the Cloud"—University of California, San Diego—ACM—Trans. Storage 5, 4, Article 14 (Dec. 2009),—28 pages.—pp. 41:1-14:28.*

* cited by examiner

FIG. 7

SELF HEALING AND RESTARTABLE MULTI-STEAM DATA BACKUP

FIELD OF THE INVENTION

This invention relates generally to backing up data, and more particularly to systems and methods for restartable, self-healing, multi-stream backup.

BACKGROUND OF THE INVENTION

Network Data Management Protocol (NDMP) is a mechanism and a protocol to move data between primary storage and secondary storage. It is used by network-attached storage ("NAS") systems to back up and/or restore data. As the capacity of data stored on NAS systems increases due to industry demand and corresponding technological advances, backing up these storage systems becomes more challenging. For example, NDMP backup sessions are single stream in that a single file system backs up to a single storage device, such as a tape drive. This can limit the efficiency of an NDMP backup, as in many cases, the backup speed is limited by the speed of the storage device that can accept data from the single NDMP stream. For example, LT05 tape drives, commonplace for backup, are limited to 140 megabytes per second without compression.

Although the amount of data to be backed up tends to increase as the capacity of a NAS system increases, in general, the backup window allotted for performing backups does not change. If the backup process is limited by both the speed of the tape drive and the time window for performing backup, network operators may have to choose between backing up all the data they desire and extending the backup window in to peak hours and possibly compete for network resources with normal network usage. Thus, there exists the need to offer more efficient backup solutions that can back up large amounts of data over smaller windows of time.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a multi-stream backup request associated with a dataset can be received. A first session and second session, among a set of sessions, are established. Sessions among the set of sessions can be dynamically assigned an upstream neighbor and a downstream neighbor based at least in part on associated stream identifiers, wherein each session in the set of sessions has one upstream neighbor and one downstream neighbor. The dataset can be split into a first segment and a second segment among a set of segments based on sequential hash values, wherein segments in the set of segments are associated with at least a segment identifier, a starting hash value, and an ending hash value. At least the segment identifier, the starting hash value, and the ending hash value for segments in the set of segments can be stored in a segment location table. The first segment can be assigned to the first sessions and the second segment can be assigned to the second session. In parallel, the first segment can be streamed by the first session to a first backup storage drive among a set of backup storage drives and the second segment can be streamed by the second session to a second backup storage drive among the set of backup storage drives, wherein the streaming is based on tree-walking a segment, and wherein the tree-walking the segment is based on sequential hash values of the segment.

In accordance with another aspect, an identifier can be stored that indicates the assigned upstream neighbor and downstream neighbor for each session in the set of sessions. A third session among the set of sessions can be established, wherein the dynamically assigning sessions within the set of sessions with an upstream neighbor and a downstream neighbor is further based on the session status file. A new segment can by dynamically split from a segment among the set of segments based on at least a current entry hash value associated with the streaming of the segment and the ending hash value of the segment. The segment location table can be updated based on the dynamic splitting. The new segment can be assigned to the third session. The new segment can be streamed by the third session to a third backup storage drive among the set of backup storage drives wherein the streaming is based on tree-walking the new segment, and wherein the tree-walking the new segment is based on sequential hash values of the new segment.

In accordance with another aspect, change events associated with the session status file can be detected. In response to detecting change events, a session among the set of sessions can determine an upstream neighbor status and a downstream neighbor status. In response to the upstream status indicating a failure, an upstream communication channel of the session can be disconnected with the upstream neighbor and a new communication channel can be connected with a new upstream neighbor. In response to the downstream neighbor status indicating a failure, a downstream communication channel of the session with the downstream neighbor can be disconnected, a new downstream communication channel of the session can be established, and a new downstream neighbor of the session can connect to the new downstream communication channel.

In another aspect, in response to streaming an entirety of a segment among the set of segments by a session among the set of sessions, sessions among the set of sessions can communicate that the segment cannot be split and a new segment can be requested by the session from at least one of the upstream neighbor of the session or the downstream neighbor of the session.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "mode" or "logical mode" ("LIN") as used herein refers to in-memory representation of on-disk data structures that may store information, or meta-data, about files and directories, such as file size, file ownership, access mode (read, write, execute permissions), time and date of creation and modification, file types, data protection process information, snapshot information, hash values associated with location of the file, etc. In one implementation, LIN's may be in a known location in a file system, for example, residing in cache memory for fast and/or efficient access by the file system. Before or in conjunction with performing a file system operation on a file or directory, a system call may access the contents of the LIN and/or the contents of the file in determining how to process the system call. In some implementations, a data structure explicitly named "mode" or LIN may be absent, but file systems may have data structures that store data similar to LINs and may provide capabilities similar to LINs as described herein. It can be appreciated that the concepts and implementations as provided herein are functional using data structures not termed LINs or modes but that offer the same functionality to the file system.

Network Data Management Protocol ("NDMP") is a mechanism and protocol for moving/copying data between primary storage and secondary storage. In general, it is used by network-attached storage system to back up or restore data. In a typical NDMP data flow, a data management application ("DMA") works in conjunction with a data server to initiate a single data flow, e.g., NDMP dump, which is then written to a single backup storage drive, for example, a single tape drive. Typically, an NDMP dump conducts a tree walk through a backup volume or directory, and the DMA sends data to the backup storage device based on that tree walk. For example, directories of a file system will be processed based on sequential hash values associated with the objects, files, blocks, etc. of the data desired to be backed up.

Implementations are provided herein for a multiple stream backup. The NDMP tree-walk process can be altered to support parallel tree-walk. Parallel tree-walk provides for splitting a backup directory among multiple sessions, where each session, in parallel can walk the tree of portions of a backup directory and stream the results, for example as an NDMP dump, to separate backup storage devices.

Figure 1:
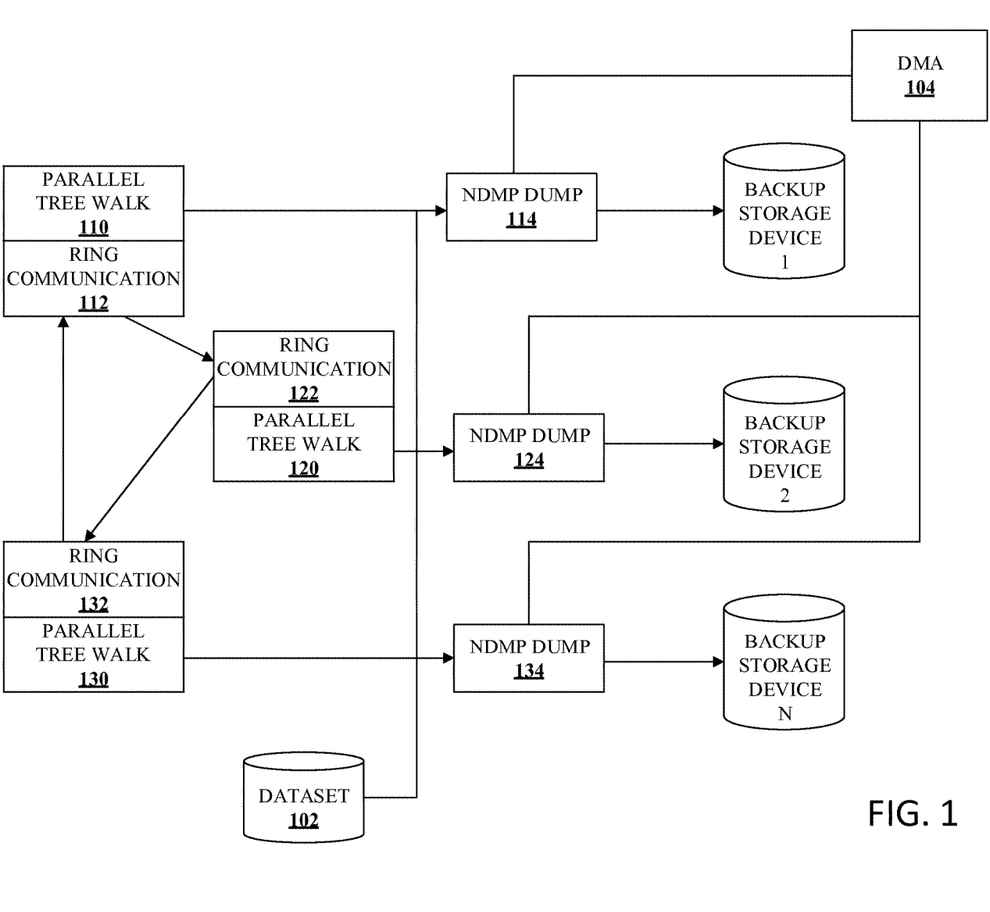
FIG. 1 illustrates an example of multi-stream backup in accordance with implementations of this disclosure.

Referring now to FIG. 1, there is illustrated an example of multi-stream backup in accordance with implementations of this disclosure. A DMA 104 can facilitate multiple NDMP backup dumps or streams (e.g., NDMP Dump 114, 124, 134, etc.) in parallel. It can be appreciated that although only three streams are depicted in FIG. 1, the process is scalable to support "N" (where N is a positive integer) multi stream backups running in parallel. An NDMP environment variable can be created to signal that a session should be part of a multi-stream backup. In one implementation, the environment variable can be labeled "MULTI_STREAM." In a non-NDMP environment, an identifier can be used signifying a request for a multi-stream backup. In a preferred implementation, the environment variable or identifier is implemented as a yes/no value to indicate whether to perform a multi-stream backup.

A session of a multi-stream backup includes a ring communication component and a parallel tree walk component. Thus, FIG. 1 depicts three sessions of a multi-stream backup (parallel tree-walk and ring communication pairs 110-112; 120-122; and 130-132). Each session can be assigned a stream identifier and be added into or removed from a multi-stream backup dynamically. This can be accomplished through the ring communication topology. For example, each session can send requests to an upstream neighbor and receive requests from a downstream neighbor. As they form a ring, each session has exactly one upstream neighbor and one downstream neighbor. It can be appreciated that in a two session multi-stream backup, the upstream neighbor and the downstream neighbor can be the same session.

Each session of a multi-stream backup can maintain a connection status to their respective upstream neighbor and downstream neighbor in a session status file. For example, if a session loses connection to either its upstream neighbor or its downstream neighbor, it can publish a change in the session status file to reflect the lost connection. Each session can then monitor the session status file, e.g., listen for changes to the file, and respond to changes in the file by severing connections with inactive neighbors, establishing connections with new neighbors, etc. The process for adding sessions and self-healing of failed or removed sessions is discussed in greater detail below.

Each session in a multi-stream backup can generate its own backup stream. A stream can consist of segments which are generated from the parallel tree-walk. Segments contain backup entries of a directory between a starting hash value and an ending hash value. Segments can include subdirectories. Segments also are associated with an identifier for identification. Segments can be tracked in a segment location table that can be maintained as a part of the multi-stream backup process. Entries in a segment location table can include a segment identifier, a parent segment identifier, a path from the root directory of the backup request to the segment directory, a segment directory LIN, a segment directory depth as related to the root directory of the backup request, a starting hash value of the segment, an ending hash value of the segment, a stream identifier associated with the segment, and a tape offset of the segment within the stream.

Parallel tree-walk can split a dataset into multiple segments and can further split existing segments into multiple segments. The splitting of a dataset and/or segments can be dynamic. For example, while walking through a directory, parallel tree-walk can determine the current hash value of the entry and split the remaining entries of the segment into two segments allowing the current segment to continue to be processed by the parallel tree-walk component, and allowing a second session to work on processing the newly generated segment. In one implementation, the split can be the half way hash value between the current hash value and the ending hash value. The segment location table can be updated to reflect the newly split segment.

In one implementation, when a session receives a message to split a segment and generate a new segment for processing by a requesting session, the session can send a message to the requesting session containing the segment identifier associated with the newly split segment, and the requesting session can then access the segment location table for further information regarding the segment to be processed.

In one implementation, if a session receives a split request, but cannot split the segment it is currently working on, for example, because it has completed or will soon complete processing the entirety of the segment currently being processed by the receiving session, then the receiving session can pass the request to its upstream neighbor. In one implementation, if the requesting session eventually receives the same split request it generated, i.e., the request was continually passed to an upstream neighbor, that this can signal that the session is complete and that there are no segments for the session to process.

As stated above, and as depicted in FIG. 1, all sessions in the same multi-stream backup can form a ring communication topology. It can be appreciated that in a distributed file system, sessions can be on different nodes. It can be further appreciated, that in some implementations, multiple sessions can operate from the same node. When the session status file of multi-stream backup changes, each session can check the status of its neighbor sessions and decide what action to take. If its neighboring sessions have not changed status, then there may be nothing for that session to do. If a session's downstream neighbor fails, the session can close the communication channel with the failed downstream neighbor and reopen a new communication channel and wait for a new downstream neighbor to connect. It can be appreciated that communication channels can occur over a port, and can be tracked and dynamically changed within the session status file. If an upstream neighbor suffers a failure, the session can close the communication channel and attempt to connect a new upstream neighbor when the session status file indicates that the neighbor is ready to accept a new connection. It can be appreciated that a communication channel can be stated in the session status file as an IP address and/or a port number that allows two sessions to find and connect to each other.

In one implementation, a new session can join the ring by announcing its existence within the session status file. Existing sessions can break existing neighbor connections and re-establish new connections to new neighbors that include the new session within the ring. A failed or completed session which causes broken connections can be detected by its neighbors who can re-heal the ring to exclude the failed or completed session. It can be appreciated that the self-healing process can take several iterations to re-establish the ring; however, each session can be responsible solely for checking its neighboring sessions for a status, even if its neighboring sessions do not stay static over time. It can also be appreciated that once the ring is healed, communication can resume within the ring; however, during the healing process, parallel tree-walk within existing sessions can continue to run without or with very little interruption.

In one implementation, multi-stream backup begins with a single session, and then sessions are dynamically added and/or removed over time.

In one implementation, the segment location table can facilitate independent restoration of segments in a multi-stream backup. By keeping accurate starting and ending hash values for each segment, even after a split, segments can be recovered independent of the entirety of the backup. For example, as stated above, a tape offset can be associated with a segment so its location on a tape drive backup storage device can be known for later independent recovery.

In one implementation, the segment location table can facilitate restartable backup of failed segments. For example, if a session experiences a failure while backing up a segment, the failure can be tracked within the segment location table. Even if that failed session never reenters the ring, a different session can restart the failed segment, irrespective of other sessions continuing to backup other segments. It can be appreciated that if a segment fails, only that segment need be restarted and any other segments that are successfully processed into backup need not be restarted. For example, NDMP provides an extension to allow restartable backup, but the option usually is turned on by the DMA when performing a backup. If the option is not turned on, then a backup generally cannot be restarted; however, the DMA can attempt to retry the same backup from the beginning. In a multi-stream backup, even when the restartable option is not turned on, individual sessions can be retried. If the DMA does not retry the session, the segments owned by the failed session can be redistributed to other active sessions. If the option is turned on, and the DMA restarts a session after a failure, the backup stream can be rebuilt using the segment location table.

FIGS. 2-5 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 2:
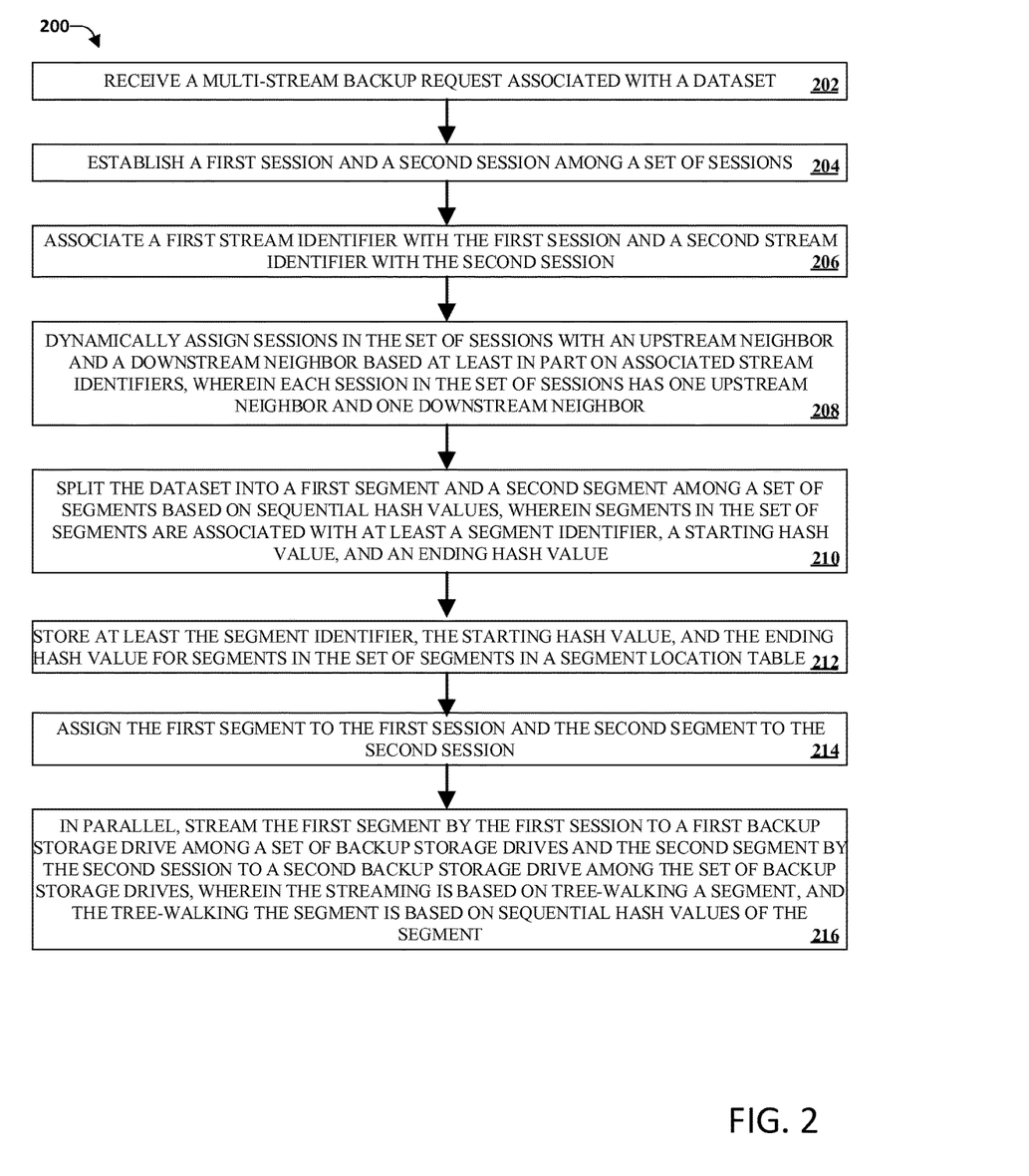
FIG. 2 illustrates an example method of multi-stream backup in accordance with implementations of this disclosure.

FIG. 2 illustrates an example method of multi-stream backup in accordance with implementations of this disclosure. At 202, a multi-stream backup request associated with a dataset can be received. At 204, a first session and a second session among a set of sessions can be established. At 206, a first stream identifier can be associated with the first session and a second stream identifier can be associated with the second session. At 208, sessions in the set of session can be dynamically assigned an upstream neighbor and a downstream neighbor based at least in part on associated stream identifiers, wherein each session in the set of sessions has one upstream neighbor and one downstream neighbor.

At 210, the dataset can be split into a first segment and a second segment among a set of segments based on sequential hash values, wherein segments in the set of segments are associated with at least a segment identifier, a starting hash value, and an ending hash value. At 212, at least the segment identifier, the starting hash value, and the ending hash value for segments in the set of segments can be stored in segment location table. At 214, the first segment can be assigned to the first session and the second segment can be assigned to the second session. At 216, in parallel, the first segment can be stream by the first session to a first backup storage drive among a set of backup storage drives and the second segment can be streamed by the second session to a second backup storage drive among the set of backup storage drives, wherein the streaming is based on tree-walking a segment and the tree-walking the segment is based on sequential hash values of the segment.

Figure 3:
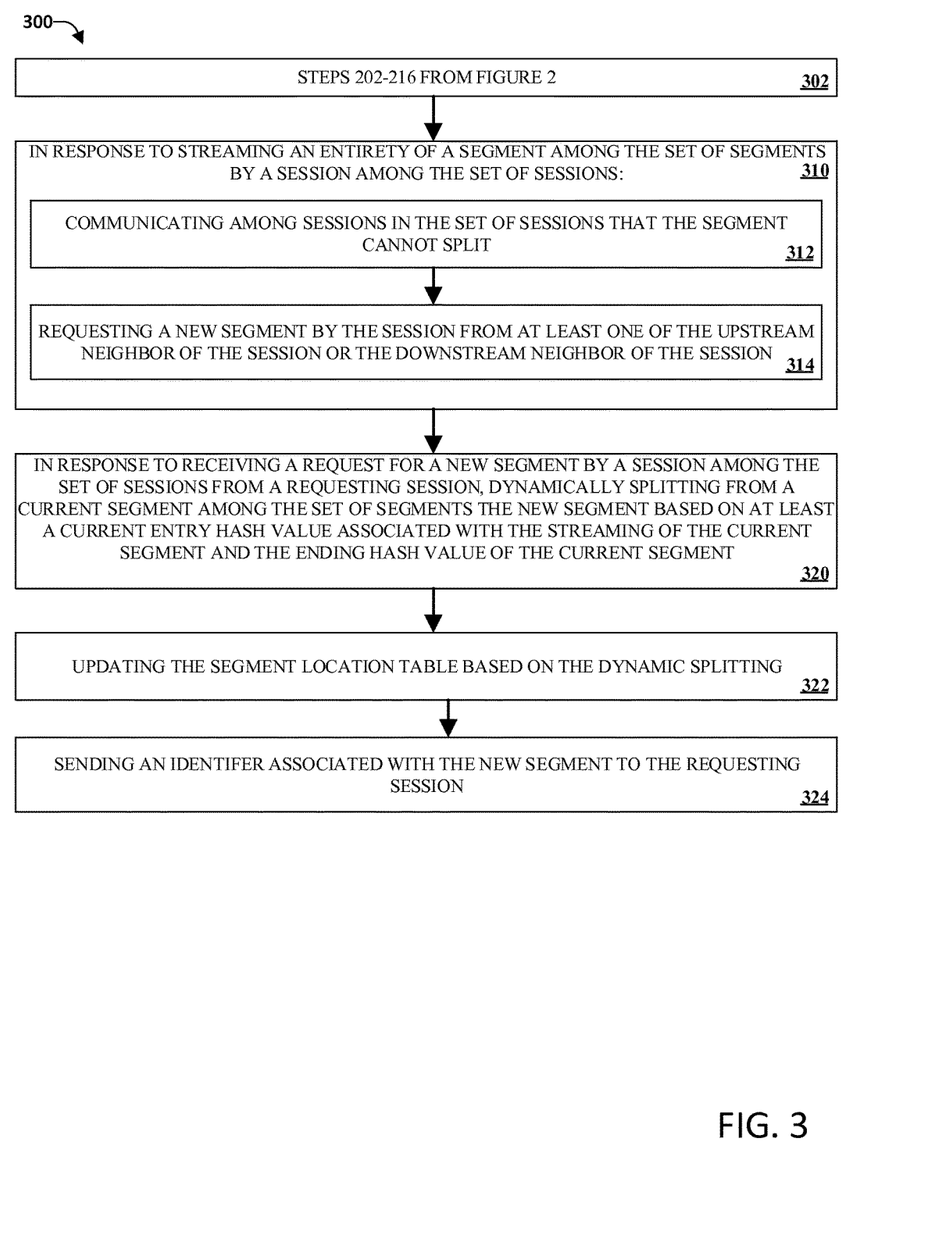
FIG. 3 illustrates an example method of multi-stream backup including finishing a segment and requesting a new segment in accordance with implementations of this disclosure.

FIG. 3 illustrates an example method of multi-stream backup including finishing a segment and requesting a new segment in accordance with implementations of this disclosure. At 302, steps 202-216 from FIG. 2 can be taken. At 310, in response to streaming an entirety of a segment among the set of segments by a session among the set of session, steps 312 and 314 can occur. At step 312, sessions among the set of session can communicate amongst themselves that the segment cannot be split. At 314, a new segment can be requested by the session from at least one of the upstream neighbor of the session or the downstream neighbor of the session.

At 320, in response to receiving a request for a new segment by a session among the set of sessions from a requesting session, dynamically split from a current segment among the set of segments the new segment based on at least a current entry hash value associated with the streaming of the current segment and the ending hash value of the current segment. At 322, the segment location table can be updated based on the dynamic splitting. At 324, an identifier associated with the new segment can be sent to the requesting session. It can be appreciated that the requesting session can then look to the updated segment location table to the additional information needed to begin streaming the new segment.

Figure 4:
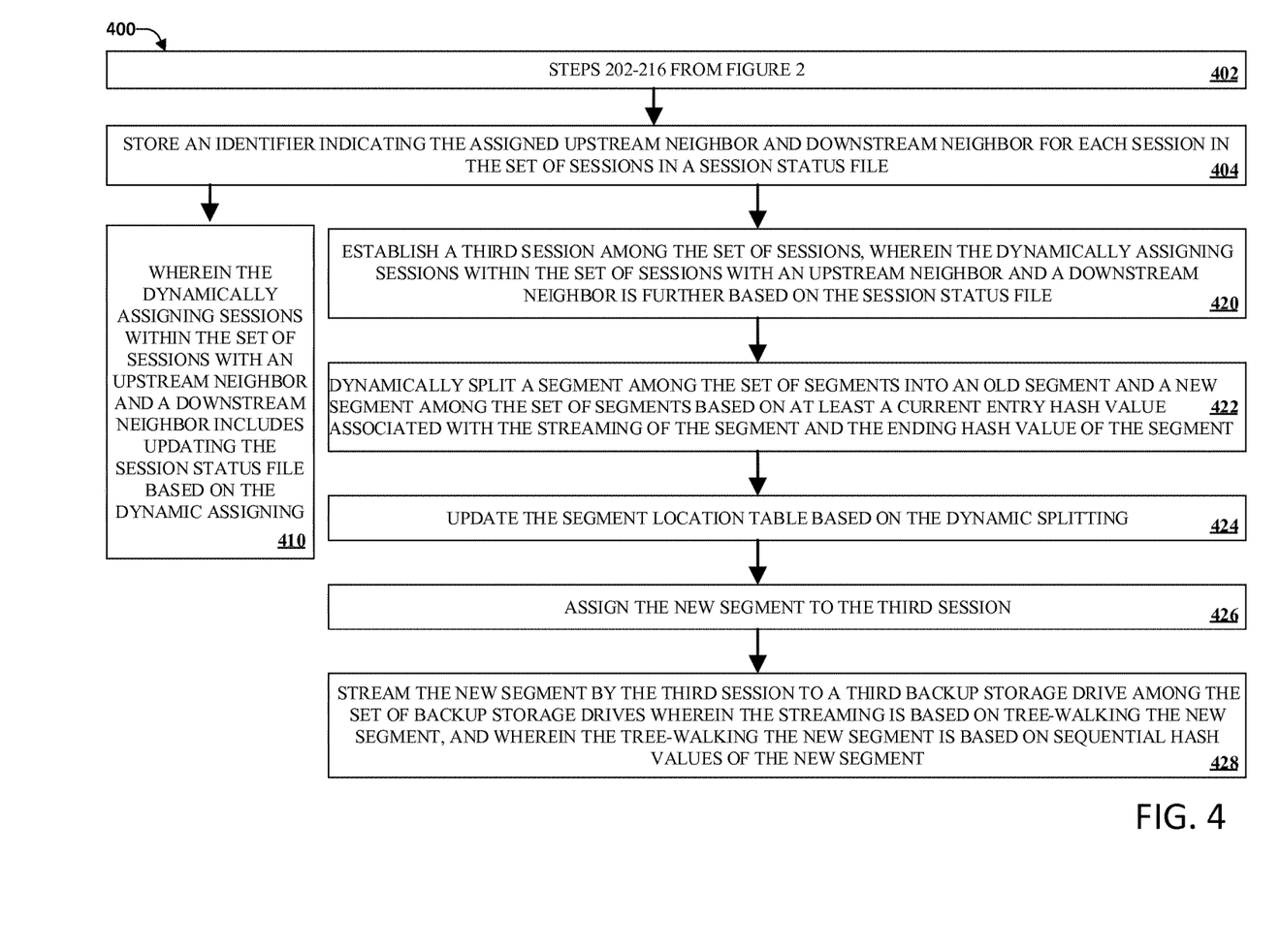
FIG. 4 illustrates an example method of multi-stream backup including adding new sessions in accordance with implementations of this disclosure.

FIG. 4 illustrates an example method of multi-stream backup including adding new sessions in accordance with implementations of this disclosure. At 402, steps 202-216 from FIG. 2 can be taken. At 404, an identifier indicating the assigned upstream neighbor and downstream neighbor for each session in the set of sessions can be stored in a session status file.

In one implementation, at 410, the dynamically assigning session within the set of session with an upstream neighbor and a downstream neighbor can include updating the session status file based on the dynamic assigning.

In one implementation, at 420, a third session among the set of sessions can be established, wherein the dynamically assigning sessions within the set of session with an upstream neighbor and a downstream neighbor is further based on the session status file. At 422, a segment among the set of segments can be dynamically split into an old segment and a new segment among the set of segments based on at least a current entry hash value associated with the streaming of the segment and the ending hash value of the segment. At 424, the segment location table can be updated based on the dynamic splitting. At 426, the new segment can be assigned to the third session. At 428, the new segment can be streamed by the third session to a third backup storage drive among the set of backup storage drives, wherein the streaming is based on tree-walking the new segment, and wherein the tree-walking the new segment is based on sequential hash values of the new segment.

Figure 5:
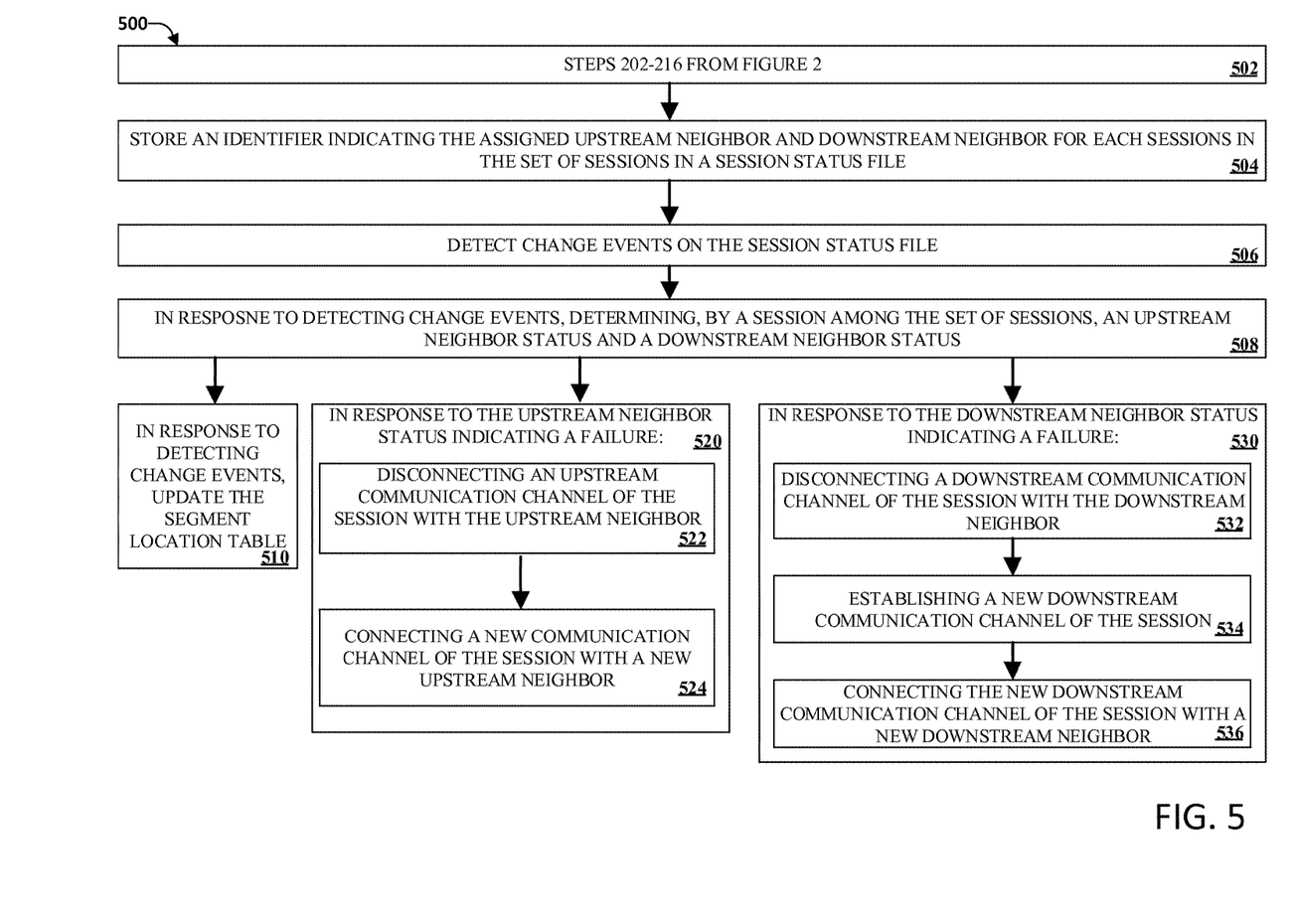
FIG. 5 illustrates an example method of multi-stream backup including self-healing in accordance with implementations of this disclosure.

FIG. 5 illustrates an example method of multi-stream backup including self-healing in accordance with implementations of this disclosure. At 502, steps 202-216 from FIG. 2 can be taken. At 504, an identifier indicating the assigned upstream neighbor and downstream neighbor for each session in the set of sessions can be stored in a session status file. At 506, change events can be detected on the session status file. For example, a session failure occurring or a new session connecting can alter the contents of the session status file, and that change can be detected by sessions among the set of session.

At 508, in response to detecting change events, a session among the session can determine an upstream neighbor status and a downstream neighbor status. Steps 510, 520 and 530 can occur independently of each other and will be explained separately. In one implementation steps 510, 520, and 530 can all occur in parallel at the same time.

At 510, in response to detecting change events, the segment location table can be updated.

At 520, in response to the upstream neighbor status indicating a failure, at 522, an upstream communication channel of the session can be disconnected from the upstream neighbor. At 524, a new communication channel of the session can be connected with a new upstream neighbor.

At 530, in response to the downstream neighbor status indicating a failure, at 532 a downstream communication channel of the session with the downstream neighbor can be disconnected. At 534, a new downstream communication channel of the session can be established. At 536, a new downstream neighbor can be connected to the session using the new downstream communication channel.

Figure 6:
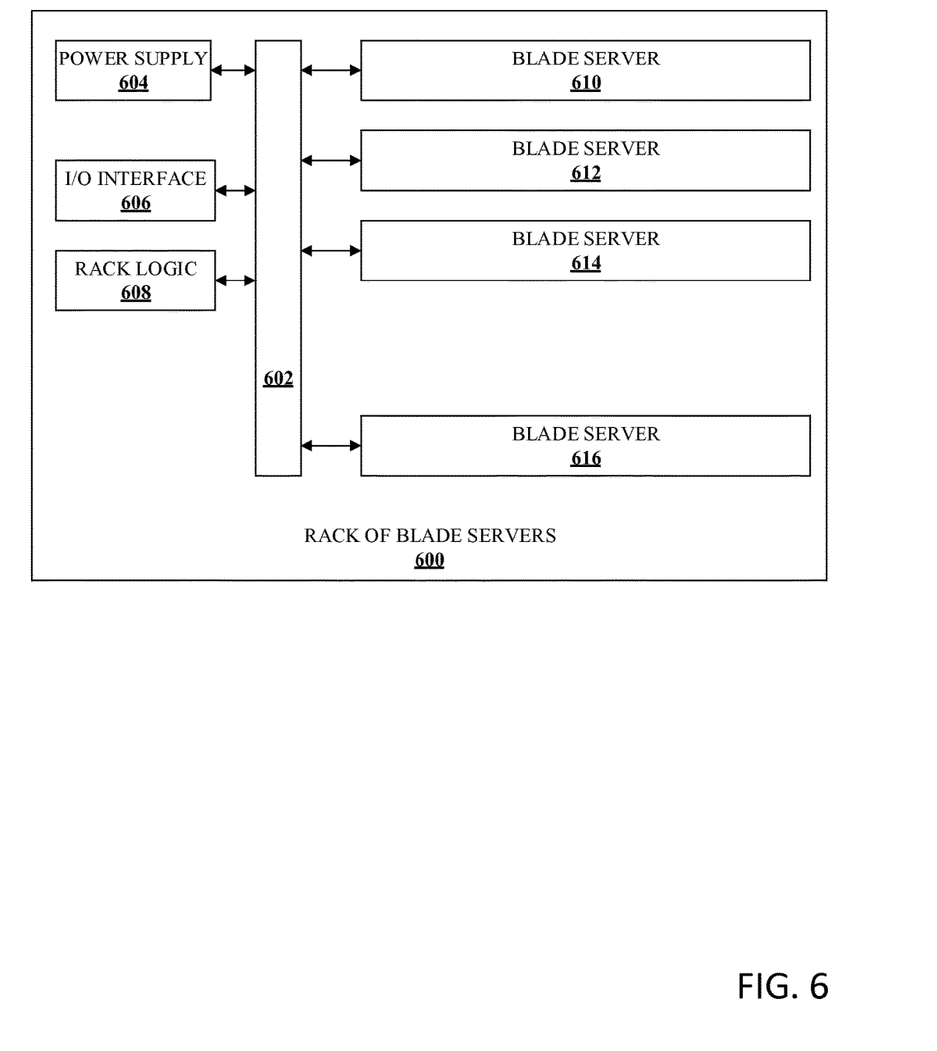
FIG. 6 illustrates an example block diagram of rack of blade servers in accordance with implementations of this disclosure.

FIG. 6 illustrates an example block diagram of rack of blade servers 600 in accordance with implementations of this disclosure. However, the components shown are sufficient to disclose an illustrative implementation. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 600 contains at least a power supply 604, an input/output interface 606, rack logic 608, several blade servers 610, 612, 614, and 616, and backplane 602. Power supply 604 provides power to each component and blade server within the enclosure. The input/output interface 606 provides internal and external communication for components and blade servers within the enclosure. Backplane 608 can enable passive and active communication of power, logic, input signals, and output signals for each blade server.

It can be appreciated that the Rack of Blade Servers 600 can be in communication with a second rack of blade servers and work in conjunction to provide distributed file system. The term blade server can also be used interchangeably with term "node" and can refer to a physical enclosure with a varying amount of CPU cores, random access memory, flash drive storage, magnetic drive storage, etc. For example, a single blade server could contain, in one example, 36 disk drive bays with attached disk storage in each bay.

Figure 7:
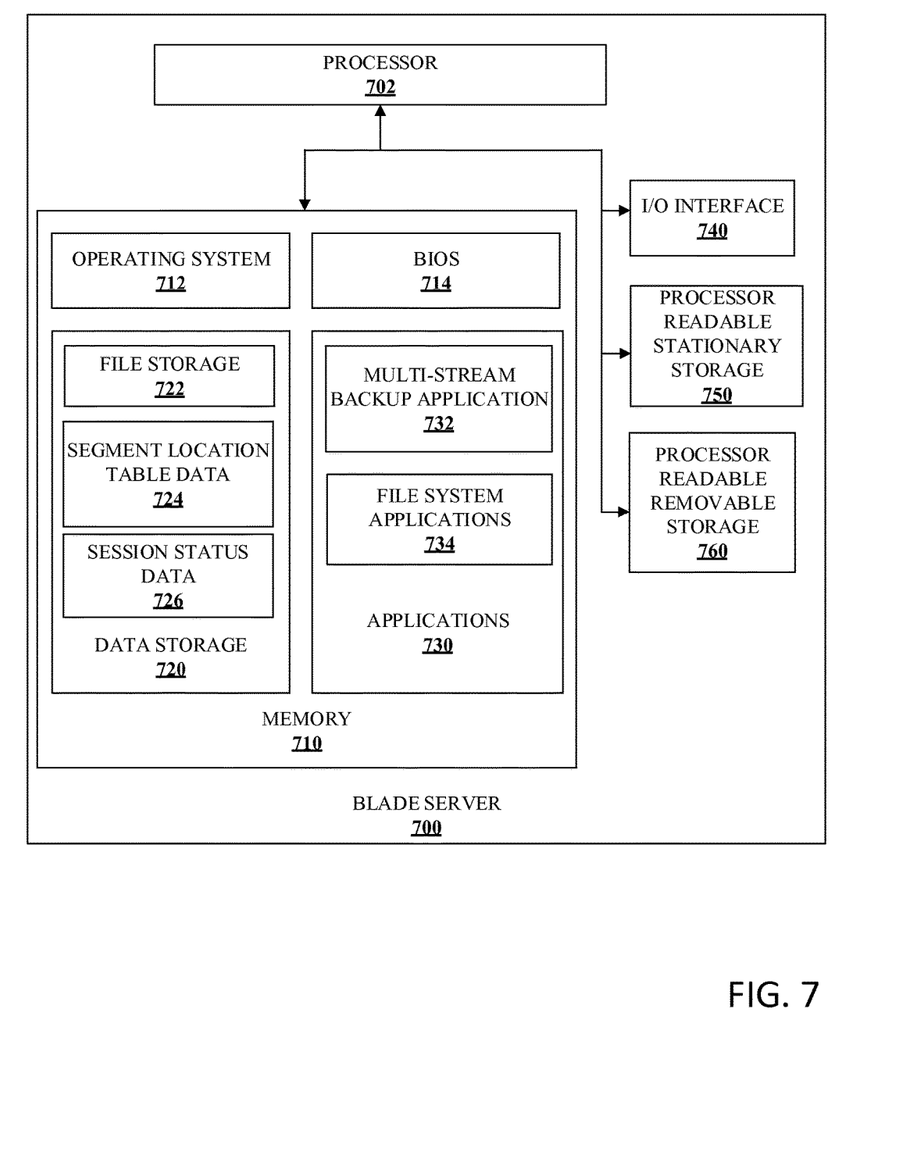
FIG. 7 illustrates an example block diagram of a blade server in accordance with implementations of this disclosure.

FIG. 7 illustrates an example block diagram of a blade server 700 in accordance with implementations of this disclosure. As shown in FIG. 6, a plurality of blade servers may be included in one enclosure that shares resources provided by the enclosure to reduce size, power, and cost.

Blade server 700 includes processor 702 which communicates with memory 710 via a bus. Blade server 700 also includes input/output interface 740, processor-readable stationary storage device(s) 750, and processor-readable removable storage device(s) 760. Input/output interface 740 can enable blade server 700 to communicate with other blade servers, mobile devices, network devices, and the like. Input/output interface can also enable blade server 700 to communicate with backup storage devices such as a magnetic hard drive, a tape drive, a flash drive, etc. Processor-readable stationary storage device 750 may include one or more devices such as an electromagnetic storage device (hard disk), solid state hard disk (SSD), hybrid of both an SSD and a hard disk, and the like. In some configurations, a blade server may include many storage devices. Also, processor-readable removable storage device 760 enables processor 702 to read non-transitive storage media for storing and accessing processor-readable instructions, modules, data structures, and other forms of data. The non-transitive storage media may include Flash drives, tape media, floppy media, disc media, and the like.

Memory 710 may include Random Access Memory (RAM), Read-Only Memory (ROM), hybrid of RAM and ROM, and the like. As shown, memory 710 includes operating system 712 and basic input/output system (BIOS) 714 for enabling the operation of blade server 700. In various embodiments, a general-purpose operating system may be employed such as a version of UNIX, LINUX™, a specialized server operating system such as Microsoft's Windows Server™ and Apple Computer's IoS Server™, or the like.

Applications 730 may include processor executable instructions which, when executed by blade server 700, transmit, receive, and/or otherwise process messages, audio, video, and enable communication with other networked computing devices. Examples of application programs include database servers, file servers, calendars, transcoders, and so forth. Applications 730 may include, for example, file system applications 734, and multi-stream backup components 732, including components to execute computer readable-instructions that implement methods, according to implementations of this disclosure. It can be appreciated that multi-stream backup application component 732 need not reside within blade server 700 for all implementations, and can be implemented in a network element, such as a DMA as shown in FIG. 1.

Human interface components (not pictured), may be remotely associated with blade server 700, which can enable remote input to and/or output from blade server 700. For example, information to a display or from a keyboard can be routed through the input/output interface 740 to appropriate peripheral human interface components that are remotely located. Examples of peripheral human interface components include, but are not limited to, an audio interface, a display, keypad, pointing device, touch interface, and the like.

Data storage 720 may reside within memory 710 as well, storing file storage 722 data such as metadata or LIN data. It can be appreciated that LIN data and/or metadata can relate to rile storage within processor readable stationary storage 750 and/or processor readable removable storage 760. For example, LIN data may be cached in memory 710 for faster or more efficient frequent access versus being stored within processor readable stationary storage 750. In addition, Data storage 720 can also host change tree data 724 in accordance with implementations of this disclosure.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
  receiving a multi-stream backup request associated with a dataset;
  establishing a first session and a second session among a set of sessions;
  associating a first stream identifier with the first session and a second stream identifier with the second session;
  dynamically assigning sessions among the set of sessions with an upstream neighbor and a downstream neighbor based at least in part on associated stream identifiers, wherein each session in the set of sessions has one upstream neighbor and one downstream neighbor;
  splitting the dataset into a first segment and a second segment among a set of segments based on sequential hash values, wherein segments in the set of segments are associated with at least a segment identifier, a starting hash value, and an ending hash value;
storing at least the segment identifier, the starting hash value, and the ending hash value for segments in the set of segments in a segment location table;
assigning the first segment to the first session and the second segment to the second session;
in parallel, streaming the first segment by the first session to a first backup storage drive among a set of backup storage drives and the second segment by the second session to a second backup storage drive among the set of backup storage drives, wherein the streaming is based on tree-walking a segment, and wherein the tree-walking the segment is based on sequential hash values of the segment; and
in response to streaming an entirety of a segment among the set of segments by a session among the set of sessions:
communicating among sessions in the set of sessions that the segment cannot be split; and
requesting a new segment by the session from at least one of the upstream neighbor of the session or the downstream neighbor of the session.

2. The method of claim 1, further comprising:
storing an identifier indicating the assigned upstream neighbor and downstream neighbor for each session in the set of sessions in a session status file.

3. The method of claim 2, wherein the dynamically assigning sessions within the set of sessions with an upstream neighbor and a downstream neighbor includes updating the session status file based on the dynamic assigning.

4. The method of claim 2, further comprising:
establishing a third session among the set of sessions, wherein the dynamically assigning sessions within the set of sessions with an upstream neighbor and a downstream neighbor is further based on the session status file.

5. The method of claim 4,
dynamically splitting from a segment among the set of segments a new segment among the set of segments based on at least a current entry hash value associated with the streaming of the segment and the ending hash value of the segment;
updating the segment location table based on the dynamic splitting;
assigning the new segment to the third session;
streaming the new segment by the third session to a third backup storage drive among the set of backup storage drives wherein the streaming is based on tree-walking the new segment, and wherein the tree-walking the new segment is based on sequential hash values of the new segment.

6. The method of claim 2, further comprising:
detecting change events associated with the session status file; and
in response to detecting change events, determining, by a session among the set of sessions, an upstream neighbor status and a downstream neighbor status.

7. The method of claim 6, further comprising:
in response to the upstream neighbor status indicating a failure:
disconnecting an upstream communication channel of the session with the upstream neighbor; and
connecting a new communication channel of the session with a new upstream neighbor.

8. The method of claim 6, further comprising:
in response to the downstream neighbor status indicating a failure:
disconnecting a downstream communication channel of the session with the downstream neighbor;
establishing a new downstream communication channel of the session; and
connecting with a new downstream neighbor of the session using the new downstream communication channel.

9. The method of claim 6, further comprising:
updating the segment location table based on the detecting change events.

10. The method of claim 1, further comprising:
in response to receiving a request for a new segment by a session among the set of sessions from a requesting session, dynamically splitting from a current segment among the set of segments the new segment based on at least a current entry hash value associated with the streaming of the current segment and the ending hash value of the current segment;
updating the segment location table based on the dynamic splitting; and
sending an identifier associated with the new segment to the requesting session.

11. A system, comprising:
a memory for storing data and instructions; and
at least one processor that executes the instructions to enable actions, including:
receiving a multi-stream backup request associated with a dataset;
establishing a first session and a second session among a set of sessions;
associating a first stream identifier with the first session and a second stream identifier with the second session;
dynamically assigning sessions among the set of sessions with an upstream neighbor and a downstream neighbor based at least in part on associated stream identifiers, wherein each session in the set of sessions has one upstream neighbor and one downstream neighbor;
splitting the dataset into a first segment and a second segment among a set of segments based on sequential hash values, wherein segments in the set of segments are associated with at least a segment identifier, a starting hash value, and an ending hash value;
storing at least the segment identifier, the starting hash value, and the ending hash value for segments in the set of segments in a segment location table;
assigning the first segment to the first session and the second segment to the second session;
in parallel, streaming the first segment by the first session to a first backup storage drive among a set of backup storage drives and the second segment by the second session to a second backup storage drive among the set of backup storage drives, wherein the streaming is based on tree-walking a segment, and wherein the tree-walking the segment is based on sequential hash values of the segment; and
in response to streaming an entirety of a segment among the set of segments by a session among the set of sessions:
communicating among sessions in the set of sessions that the segment cannot be split; and requesting a new segment by the session from at least one of the upstream neighbor of the session or the downstream neighbor of the session.

12. The system of claim 11, wherein the at least one processor further enables actions comprising:
storing an identifier indicating the assigned upstream neighbor and downstream neighbor for each session in the set of sessions in a session status file.

13. The system of claim 12, wherein the dynamically assigning sessions within the set of sessions with an upstream neighbor and a downstream neighbor includes updating the session status file based on the dynamic assigning.

14. The system of claim 12, wherein the at least one processor further enables actions comprising:
establishing a third session among the set of sessions, wherein the dynamically assigning sessions within the set of sessions with an upstream neighbor and a downstream neighbor is further based on the session status file.

15. The system of claim 14, wherein the at least one processor further enables actions comprising:
dynamically splitting from a segment among the set of segments a new segment among the set of segments based on at least a current entry hash value associated with the streaming of the segment and the ending hash value of the segment;
updating the segment location table based on the dynamic splitting;
assigning the new segment to the third session;
streaming the new segment by the third session to a third backup storage drive among the set of backup storage drives wherein the streaming is based on tree-walking the new segment, and wherein the tree-walking the new segment is based on sequential hash values of the new segment.

16. The system of claim 12, wherein the at least one processor further enables actions comprising:
detecting change events associated with the session status file; and in response to detecting change events, determining, by a session among the set of sessions, an upstream neighbor status and a downstream neighbor status.

17. The system of claim 16, wherein the at least one processor further enables actions comprising:
in response to the upstream neighbor status indicating a failure:
disconnecting an upstream communication channel of the session with the upstream neighbor; and
connecting a new communication channel of the session with a new upstream neighbor.

18. The system of claim 16, wherein the at least one processor further enables actions comprising:
in response to the downstream neighbor status indicating a failure:
disconnecting a downstream communication channel of the session with the downstream neighbor;
establishing a new downstream communication channel of the session; and
connecting with a new downstream neighbor of the session using the new downstream communication channel.

19. The system of claim 16, wherein the at least one processor further enables actions comprising:
updating the segment location table based on the detecting change events.

20. The system of claim 11, wherein the at least one processor further enables actions comprising:
in response to receiving a request for a new segment by a session among the set of sessions from a requesting session, dynamically splitting from a current segment among the set of segments the new segment based on at least a current entry hash value associated with the streaming of the current segment and the ending hash value of the current segment;
updating the segment location table based on the dynamic splitting; and
sending an identifier associated with the new segment to the requesting session.

* * * * *